United States Patent

[11] 3,565,395

| [72] | Inventor | George E. Hansen<br>Elmwood Park, Ill. |
|---|---|---|
| [21] | Appl. No. | 847,919 |
| [22] | Filed | Aug. 6, 1969 |
| [45] | Patented | Feb. 23, 1971 |
| [73] | Assignee | Crane Co.<br>Chicago, Ill. |

[54] COILED VALVE BODY AND METHOD OF MAKING THE SAME
14 Claims, 7 Drawing Figs.

[52] U.S. Cl. .................................................. 251/306,
29/157.1
[51] Int. Cl. .................................................. F16k 1/22,
B21d 53/00
[50] Field of Search ........................................ 251/173,
305—308, 315, 367; 138/140, 142, 143, 145;
220/3; 29/157.1, 446, 471.1, 477.3

[56] References Cited
UNITED STATES PATENTS
| 925,809 | 6/1909 | Henss ........................ | 251/367X |
| 2,138,098 | 11/1938 | Holmes ...................... | 251/305X |
| 2,363,967 | 11/1944 | Jasper ........................ | 138/140 |
| 3,185,489 | 5/1965 | Klinger-Lohr ............... | 251/315X |
| 3,074,584 | 1/1963 | Dobell ........................ | 220/3 |
| 3,095,177 | 6/1963 | Muller ........................ | 251/173 |
| 3,121,283 | 2/1964 | Kaempen .................... | 29/471.1 |

Primary Examiner—Henry T. Klinksiek
Attorney—George S. Schwind

ABSTRACT: This invention relates to a fabricated hollow body for containing fluids, for use as a valve body or the like, and a method for making the same. The body is fabricated by coiling a strip of fluid-impervious sheet material upon itself a predetermined number of turns, with the successive layers of the material overlaid in alignment to form a hollow body having multilayered wall means of substantially uniform predetermined thickness. Means are provided to secure the successive layers of the coiled sheet together and thereby maintain the sheet in its coiled configuration. Means are also provided to form a valve seat around the inner periphery of the hollow body to adapt the body for use as a valve body.

3,565,395

COILED VALVE BODY AND METHOD OF MAKING THE SAME

GENERAL BACKGROUND AND DESCRIPTION well-known by those skilled in the art, there is a need for fluid-containing bodies, such as valve bodies and the like, of improved design which can be quickly and economically fabricated to meet the size, strength, and corrosion-resistant requirements of particular installations. This need is generated principally by the fact that the cast iron or welded steel structures currently in use have been found to have substantial disadvantages. With such structures, costly tooling and manufacturing steps must be duplicated to provide structures of different sizes and strengths. Moreover, it has been found necessary to maintain a substantial inventory of such structures to meet the demand for structures of varying sizes and strengths, Also, foundry molds, patterns, etc., must be maintained and preserved for considerable time.

It also has been found to be difficult and costly to provide cast iron or welded steel structures of a particular size and strength with corrosion-resistant surfaces. To meet the needs of special installations with these prior structures, it is necessary either to cast or fabricate the structure entirely from the desired corrosion-resistant material, such as stainless steel, or to coat or line the wear surfaces after the structure is constructed. It is thus a costly and time-consuming process to provide these prior structures with special corrosion resistance properties. The construction of these prior structures also presents problems with respect to the placement of valve seats and the like inside the structures.

The present invention avoids the above problems by proving a fabricated body having mechanical and physical properties which are equal to or exceed the properties of cast iron or welded steel bodies. The invention further provides a method of fabricating a fluid-containing body method allows the body to be manufactured quickly and economically in the desired size and configuration from a selected fluid-impervious material. The method of this invention also permits the bodies to be provided with corrosion resistant surfaces and readily adapted to receive valve seat means and the like. As a result of this invention, structures for containing fluids can be manufactured quickly with greatly reduced tooling and labor costs. The ease and speed by which structures of various sizes, strengths and wear properties can be constructed with this invention also allows a substantial reduction in inventory costs. Further, the proposed method provides an unlimited selection of standard material wherein the only inventory necessitated is standard strip stock used to fabricate the body.

Briefly described, the present invention comprises a hollow body for containing fluids having a multilayered wall means formed from at least one continuous sheet of fluid-impervious material. The sheet material is coiled upon itself with the successive layers of the sheet overlaid and secured together in aligned relationship, and can have a uniform width so as to form a coiled body of uniform predetermined length. Alternatively, the sheet can be formed from a plurality of continuous sheets coiled together in end-to-end relationship, and the sheets can have different widths so as to provide the coiled body with portions having different lengths. When adopted for use as a valve body for butterfly valves or the like, the inner periphery of the body and be readily provided with a continuous valve seat.

In accordance with this invention the foregoing body is fabricated by coiling a length of fluid impervious sheet material upon itself a predetermined number of times, such as around a mandrel or the like, with the successive layers of the material overlaid in alignment. The coiling operation thereby forms a hollow body having wall means of substantially uniform thickness which are defined by the multiple layers of the coiled sheet. After the sheet is coiled, the successive layers are rigidly joined together to maintain the layers in coiled configuration.

Further objects and features of the present invention will be more fully understood from the following description of several embodiments thereof, taken in conjunction with the accompanying drawings in which.

EXEMPLARY EMBODIMENTS

Figure 2:
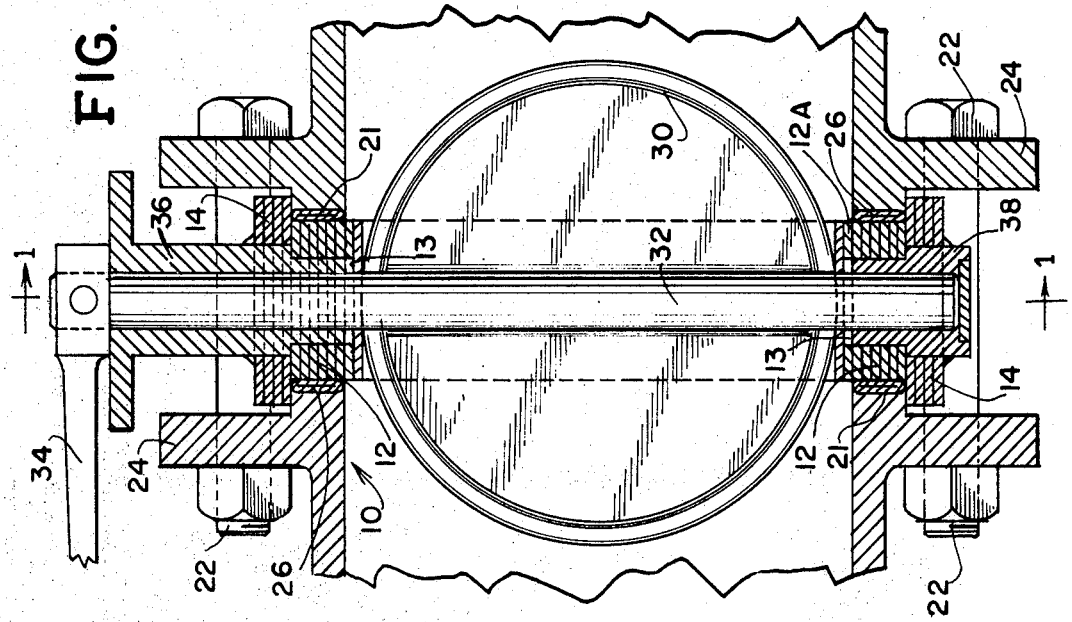
FIG. 2 is a cross-sectional side view of the butterfly valve assembly, taken along the line 2–2 in FIG. 1.
Figure 1:
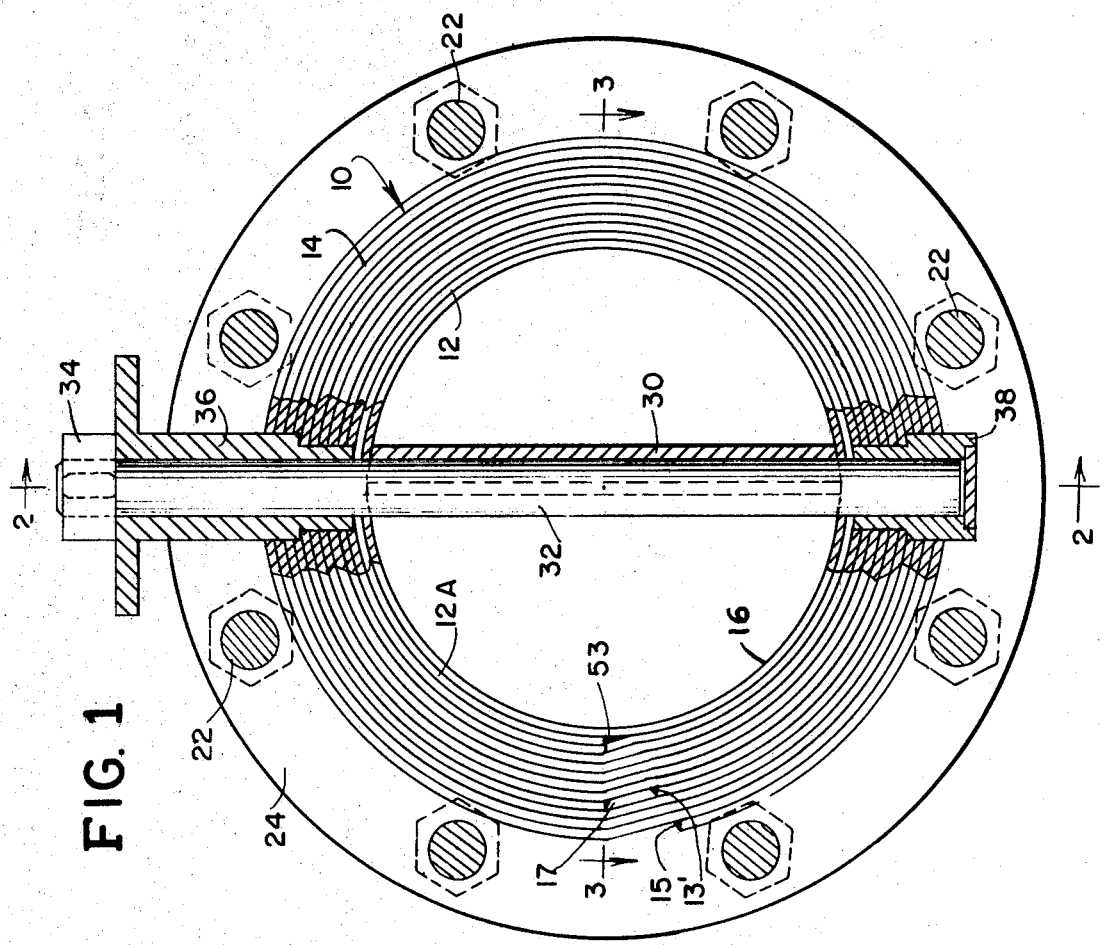
FIG. 1 is a cross-sectional end view illustrating one embodiment of the coiled body in accordance with the present invention incorporated in a butterfly valve assembly.
Figure 3:
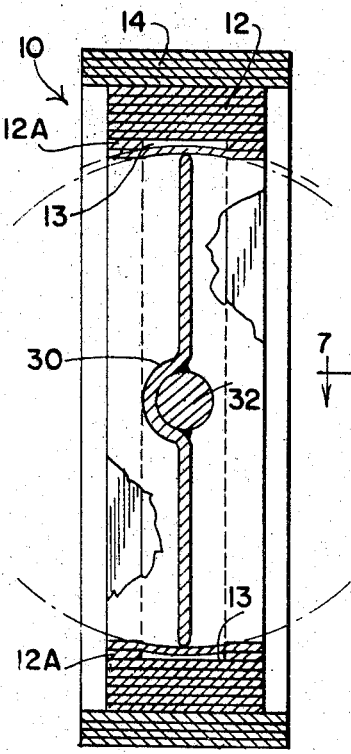
FIG. 3 is a cross-sectional top view of the coiled body of the valve assembly, taken along the line 3–3 in FIG. 1.

One embodiment of the coiled body having the features an advantages of the present invention is generally indicated by the reference numeral 10 in FIGS. 1—3. The body 10 is adapted for use as a butterfly valve body, and therefore is illustrated in place between end faces 21 of a pair of mating fluid conduits 20. Flange bolts 22 extend through flange fittings 24 to secure the valve body 10 in place between the conduits 20 in the usual manner. A suitable gasketing material 26 may be inserted between the end faces 21 of the conduits and the valve body 10 to assure that the valve assembly is fluid-tight. It is understood that the coiled valve body may, if desired, utilize a type of seat which incorporates the gasket sa an integral part of the seat, as shown in the Cotterman et al. U.S. Pat. No. 3,173,650, issued on Mar. 16, 1965. This type of seat may also be molded to the body in a conventional manner, if so desired.

As illustrated in FIG. 2, the valve body 10 is circular in cross section and has a predetermined internal diameter which adapts the body to receive a butterfly valve disc 30. The disc 30 is supported by a valve stem 32 in the conventional manner. A handle 34 is joined to the upper end of the stem 32, and can be operated to rotate the disc 30 within the valve body 10 and thereby regulate the flow of fluid through the conduits 20. Trunnions 36 and 38 are provided in aligned bores in the valve body 10 to support the valve stem 32 and the valve disc 30.

In accordance with this invention, the wall portion of the fabricated valve body 10 comprises multiple layers of fluid impervious sheet material, and is formed by coiling one or more sheets of such material so that successive layers are engaged and secured together in an aligned relationship. The sheet material which is coiled to form the valve body 10 can be any desired basic fluid-impervious material, such as conventional rolled steel, or, stainless steel or the like, and can be selected to have a thickness and width which meet the strength and dimensional requirements of a particular installation. More than one sheet can be coiled to form the body, and if desired, the various sheets can have different widths so as to impart portions of the body 10 with different widths. Further, one or both sides of the sheet material can be precoated with a corrosion-resistant material, such as stainless steel, tetrafluoroethylene, aluminum or copper alloys or the like, before the material is coiled. Thus, the body 10 can be readily fabricated from a desired type of material to have a variety of selected physical and mechanical properties.

The embodiment of the body 10 illustrated in FIGS. 1—3 is formed from coiling two sheets of material together to provide portions of the body with different widths. A first sheet 12 of a selected relatively narrow width is used to form the inner coiled layers, and a second sheet 14 of a relatively larger width is wound around the first sheet 12 to form the outer coiled layers. The sheets 12 and 14 are maintained in a tightly coiled relationship by suitable fastening means, such as tack welds 13' and 15, which secure the free ends of the sheets 12 and 14, respectively, to the adjacent coiled layer of sheet material. Further, as indicated in FIG. 1, the leading end of the outer sheet 14 is secured to the coiled sheet 12 by means such as a tack weld 17.

As illustrated in FIG. 2, since the sheets 12 and 14 have parallel side edges, the coiling of the sheets 12 and 14 with the successive layers in alignment places the side edges of the layers formed by each sheet in registry. The body 10 is thereby provided with a wall portion of reduced width which can receive the end faces 21 of the conduits 20. Of course, the width of the sheets 12 and 14 can be substantially the same, to provide the valve body with a uniform width, if that arrangement satisfies the needs of a particular installation. The number of layers of the coiled sheets 12 and 14 are selected to provide the valve body 10 with the desired thickness.

The valve body 10 is further provided with a continuous valve seat 16 which is dimensioned to forcefully engage against the periphery of the valve disc 30 during operation of a butterfly valve assembly. The seat 16, which can be formed from rolled steel or other suitable flexible impervious material, is secured within the inner periphery of the body 10, such as by welding, by to the innermost coiled layer 12A of the sheet 12. In the illustrated embodiment, this innermost coiled layer 12A of the valve body 10 is provided with a central recess 13, which extends around the inner periphery of the valve body 10 and allows the seat 16 to flex inwardly in response to engagement with the disc 30. This construction assures that the valve disc 30 will seat against the valve seat 16 in a substantially fluid-tight arrangement.

Figure 5:
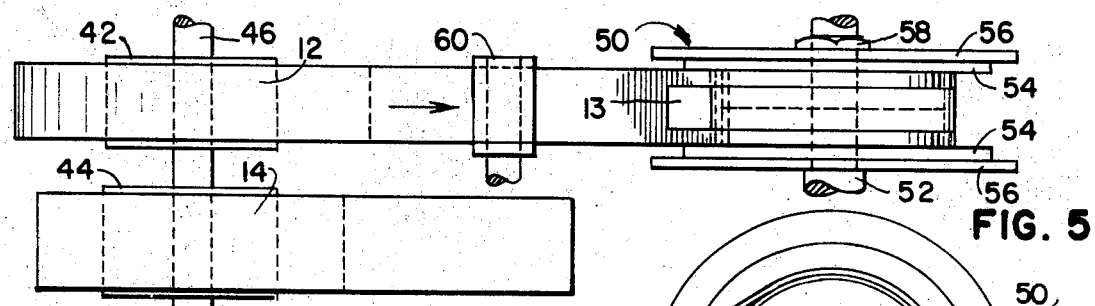
FIG. 5 is a partial schematic plan of the fabricating apparatus illustrated in FIG. 4.
Figure 4:
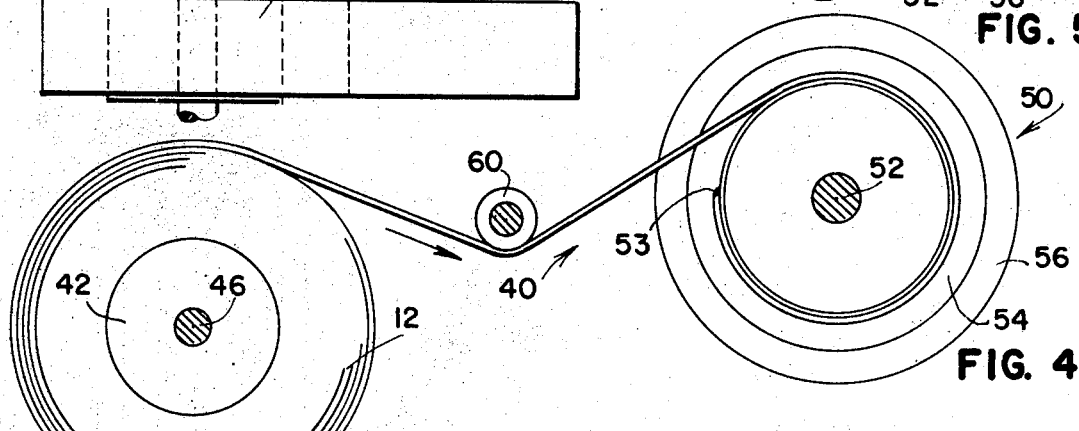
FIG. 4 is a partial cross-sectional view schematically illustrating apparatus for fabricating the coiled body in accordance with the fabricating method to the present invention.

The method of fabricating the coiled body 10 in accordance with this invention is illustrated schematically in FIGS. 4 and 5 of the drawings. The first step in fabricating the body 10 is to provide an adequate supply of the sheet materials 12 and 14 at a coiling station 40. In the preferred arrangement, the sheet 12 and 14, having the desired strength, dimensions and corrosion resistant properties, are stored in rolls at the coiling station by suitable means, preferably on movable supply rollers such as rollers 42 and 44. As indicated in FIG. 5, the rollers 42 and 44 are mounted on a common shaft 46 adjacent a winding mandrel 50 and can be shifted along the shaft 48 into alignment with the mandrel.

The mandrel 50 of the coiling station 40 is mounted on a rotatable shaft 52 which is coupled to a power source (not shown). The shaft 52 will thereby rotate the mandrel 50 at a predetermined speed during the valve-fabricating operation. The sideplates 54 are spaced and dimensioned to receive the coiled layers of the narrow sheet 12, and the sideplates 56 are spaced to receive the coiled layers of the sheet material 14. A suitable fastener 58 secures the sideplates to be removed 54 and 56 on the mandrel 50, and permits one pair of the sideplates to be removed so that the coiled valve body can be discharged from the mandrel after the coiling operation is completed. The coiling station 40 also includes a movable tension roller 60 for adjusting the tension in the sheets 12 and 14 as the sheets are fed from the supply rollers 42 and 44 onto the mandrel 40. 50.

The fabrication of the coiled valve body 10 is begun by placing the valve seat 16 on the mandrel 50. The mandrel sideplates 54 and 56 then are secured to the mandrel by the fastener 58. Next, the sheet material 12 is fed past the tension roller 60 to the mandrel 50, and its leading edge is secured to the surface of the valve seat 16 by suitable means such as a tack weld 53, or, by a pin means inserted through the leading edge into the mandrel. As indicated in FIG. 5, the first portion of the sheet 12, which will form the innermost coiled layer 12A of the valve body, may be cut away to form the recess 13.

After the above arrangements are completed, the mandrel 50 is rotated and coils the sheet 12 around itself, about the valve seat 16. The number of turns of the mandrel is determined by the number of layers of the sheet 12 desired in the completed valve body. The sideplates 54 assure that the successive layers of the sheet 12 are overlaid in aligned relationship, and the tension roller 60 is adjusted to assure that the coiled layers of the sheet 12 are wound tightly together. After the sheet 12 has been coiled on the mandrel to form a wall segment having the desired thickness, the sheet 12 is cut, and the resulting loose end is secured by the weld 13', or by other suitable means, to the adjacent coiled layer.

Next, the same steps are followed to form the outer portion of the body 10 from the wider sheet 14. To accomplish this, the supply rollers 42 and 44 are shifted on the shaft 46 to bring the sheet 14 into alignment with the mandrel 50. The sheet 14 then is fed past the tension roller 60, and its leading edge is secured by the tack weld 17 or the like, to the outer coiled layer of the sheet 12. The mandrel then is rotated and the sheet 14 is coiled around the coiled sheet 12, the desired number of turns. The sideplates 56 cause the successive layers of sheet 14 to be coiled in alignment with each other and with the coiled layers of the sheet 12. Also, the tension roller 60 is adjusted to apply the proper winding tension to the sheet 14, to assure that the successive layers of the sheet are wound tightly together.

After the sheet 14 has been coiled about the coiled sheet 12 the desired number of turns, to provide the outer portion of the valve body with the desired thickness, the sheet 14 is severed, and the loose end is secured, by the tack weld 15 or the like, to the adjacent coiled layer of the sheet. The sheets 12 and 14 are thereby coiled to form the multilayered wall means of the valve body 10.

To complete the fabrication of the valve body 10, the sideplates 54 and 56 are removed, and the coiled layer valve body is discharged from the mandrel 50. The coiled layers of the sheets 12 and 14 then are secured together, by suitable means, to maintain the sheets in coiled configuration. To accomplish this, the coiled layers can be spot welded together along their edges at several points, or can be secured together by driving a wedge pin or the like into the layers. The coiled body 10 is then ready to be finished and bored to receive the valve trunnions 36 and 38.

Figure 7:
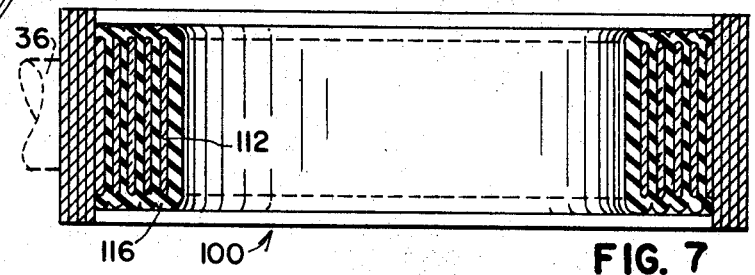
FIG. 7 is a cross-sectional side view of the second embodiment of the coiled body, taken along line 7–7 in FIG. 6.
Figure 6:
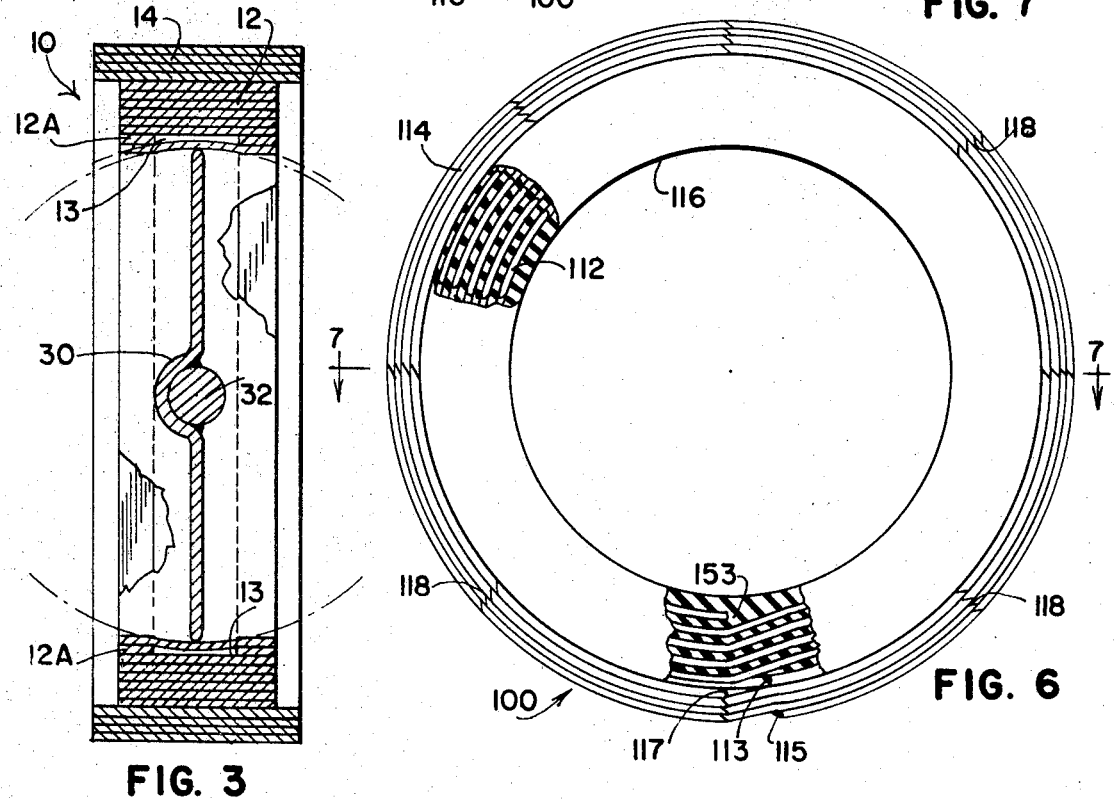
FIG. 6 is a cross-sectional end view of a second embodiment of coiled body constructed in accordance with this invention.

FIGS. 6 and 7 illustrate a modified coiled valve body 100 in accordance with this invention. As in the above-described valve body 10, the wall portion of the valve body 100 is formed from multiple layers of coiled fluid impervious sheet material. The inner coiled layers are formed from coiling a relatively narrow sheet 112, and the outer coiled layers are formed from coiling a relatively wide sheet 114. By this arrangement, the valve body 100 can be placed between the end faces 21 of the conduits 20 in the same manner as illustrated with respect to the valve body 10 in FIG. 2. The valve body 100 can be provided with the butterfly disc 30 and supporting trunnions 36 and 38, in the same manner as described above with respect to the body 10.

The sheet 114 forming the outer coiled layers of the body 100 is tightly wound in a manner similar to the coiled outer layers of the body 10. However, the body 100 the sheet 112 forming the inner coiled layers is loosely wound so that the successive layers of the sheet are spaced, as illustrated in FIG. 7. This arrangement separates the inner coiled layers formed by the sheet 112, and permits the inner layers of the body 100 to receive a molded valve seat 116. The loosely wound inner coiled layers of the sheet 112 further allow the valve seat 116, of a suitable elastomeric material, to be molded within the inner periphery of the body 100 in firm engagement with the sheet 112 between the loosely coiled layers. The valve seat 116 is thereby securely mounted within the valve body 100 and will not work loose during the operation of the valve assembly.

Further, the resilience of the elastomeric material forming the valve seat 116 tends to force the coiled layers of the sheet 112 apart. However, a reaction force created by the coiled layers of the sheet 112 urges the seat 116 inwardly toward the center of the valve 100 and, as a result, subjects the seat 116 to a preloaded pressure which urges the seat into engagement with the periphery of the butterfly valve disc of the valve assembly.

It is understood, of course, that the inner layers of the valve body may also be tightly wound, as described with reference to FIGS. 1—3 and a molded seat be applied wherein the elastomeric material would not be injected between the layers but would only be deposited on the inner surface of the body and on end faces 21 to form a unitary gasket between the valve body and the mating conduits.

A method for fabricating the modified valve body 100 is ver similar to the above-described method for fabricating the valve body 10. The fabrication process is initiated by providing the coiling station 40 (FIGS. 4 and 5) with a supply of sheets 112 and 114. Then, the leading edge of the sheet 112 is secured to the mandrel 50 by a weld 153 or by a suitable pin connection or the like, and the sheet 112 is coiled by rotation of the mandrel. The tension roller 60 is adjusted so that the inner coiled layers of the body formed by the sheet 112 are overlaid in a loosely wound relationship, as illustrated in FIG. 7. When the successive layers of the coiled sheet 112 have reached the desired thickness, the mandrel 50 is stopped and the sheet 112 is cut. The resulting free end of the sheet is secured by the tack weld 113 to the adjacent coiled layer, to maintain the sheet in its coiled configuration on the mandrel.

The supply of sheet material 114 is shifted into alignment with the mandrel 50, and the free end of the material is secured, by the weld 117 or the like, to the outer coiled layer of the sheet 112. The mandrel 50 is then rotated to coil the sheet 114 around the sheet 112. During this coiling operation, the tension roller 60 is adjusted so that the successive layers of the sheet 114 are coiled tightly together. The sheet 114 then is severed, and its free end secured by the weld 115. Next, the end plates 54 and 56 of the mandrel are removed, and the coiled valve body 100 is discharged from the mandrel 50.

After the coiling operation for the valve body 100 is completed, the successive coiled layers of the sheets 112 and 114 are rigidly joined in coiled relationship, by suitable means such as a weld 118 along the edges of adjacent coiled layers, or a wedge pin or the like driven into successive layers. Then, the fabrication of the valve body 100 is completed by transferring the body to a suitable molding station. At such station, the elastomeric valve seat 116 is molded around the inner periphery of the body so that the material is firmly engaged between the loosely coiled inner layers of the sheet 112, such as illustrated in FIGS. 6 and 7.

Although the present invention has been described above with a certain degree of particularity with respect to valve bodies, it should be understood that the present disclosure has been made only by way of example. Consequently, numerous changes in the details of construction and the combination and arrangement of components, as well as the possible modes of utilization, will be apparent to those skilled in the art and may be resorted to without departing from the spirit and scope of the invention as claimed.

I claim:

1. In a fabricated valve body, the combination including, a multilayered wall portion, said wall portion being formed from at least one continuous sheet of fluid impervious material coiled upon itself so that the successive layers of the coiled sheet are overlaid in alignment, disc closure means positioned in said body and adapted for rotation therein, said disc adapted to be positioned in sealing relationship with said body, and, means to position said disc.

2. The structure according to claim 1 wherein the inner layer of said coiled sheet material includes a flexible seat material affixed thereto.

3. The structure of claim 2 wherein said seat material is bonded to said inner layer.

4. The structure of claim 1 wherein the outer coiled layers of said sheet are engaged and secured in a tightly coiled relationship and the inner coiled layers of said sheet are arranged in a loosely coiled relationship, and valve seat means at elastomeric material mounted around said inner periphery of said valve body and firmly secured to said wall portion by engagement between said loosely coiled inner layers of said sheet.

5. A method of fabricating a valve body comprising the steps of:
　1. providing a supply of fluid impervious sheet material;
　2. coiling said sheet material upon itself about a mandrel a predetermined number of turns with the inner coiled layers of said sheet material arranged in relatively loosely coiled relationship and the outer coiled layers arranged in relatively tightly coiled relationship so that the successive coiled layers of said sheet material are overlaid in alignment to form a hollow valve body having a multilayered wall portion;
　3. rigidly joining successive layers of said sheet material together to secure said layers in said coiled relationship; and
　4. forming a valve seat around the inner periphery of said body by molding a layer of elastomeric material within said coiled layers so that said elastomeric material is firmly engaged between said loosely coiled inner layers of said sheet material.

6. A structure for receiving fluid comprising a hollow body member having multilayered wall means of substantially uniform thickness formed from a plurality of continuous sheets of fluid impervious material coiled with the successive layers of said sheet engaged and secured together in aligned relationship wherein one of said sheets has a uniform width reduced with respect to the width of another sheet and thereby provides a portion of said wall with a reduced width.

7. A structure in accordance with claim 6 wherein said body member further includes a closed performed member positioned within and secured to said coiled sheet to define the interior layer of said body walls.

8. In a fabricated valve body, a multilayered wall portion of substantially uniform thickness an length formed from at least one continuous sheet of fluid impervious material coiled upon itself with the successive layers of said coiled sheet engaged and secured together in aligned relationship wherein the inner coiled layer of said wall portion defines the inner periphery of said valve body and wherein said body includes a continuous valve seat extending around said inner periphery and secured to said inner layer.

9. A fabricated valve body in accordance with claim 8 wherein said valve seat comprises elastomeric material molded to said inner coiled layer of said wall portion.

10. A fabricated valve body in accordance with claim 8 wherein said valve seat comprises a sheet of flexible metallic material secured to said inner coiled layer and wherein said coiled layer is recessed to permit said metallic seat to flex toward said wall portion.

11. A method of fabricating a hollow body for containing fluids adapted for use as a valve body or the like comprising the steps of:
　1. Providing a supply of fluid impervious sheet material comprising at least two sheets wherein one of said sheets has a reduced width and wherein said sheets are joined together in substantial end to end relationship;
　2. coiling said reduced width sheet material upon itself a predetermined number of turns with the successive layers of said material overlaid in alignment to form a hollow body having walls defined by multiple layers of said coiled sheet; and
　3. rigidly joining successive coiled layers of said sheet together to secure said layers in coiled configuration.

12. A method of fabricating a valve body comprising the steps of:
　1. providing a supply of fluid impervious sheet material;
　2. coiling sheet material upon itself about a mandrel a predetermined number of turns with the successive layers of said material overlaid in alignment to form a hollow valve body having a multilayered wall;

3. rigidly joining successive coiled layers of said sheet material together to secure said layers in said coiled configuration; and
4. securing a valve seat to the inner coiled layer of said sheet material.

13. A method of fabricating a valve body in accordance with claim 12 wherein said seat comprises a continuous metallic seat secured to said inner coiled layer by the steps of placing said seat on said mandrel and coiling said sheet about said seat.

14. A method of fabricating a valve body in accordance with claim 12 wherein said seat comprises a layer of elastomeric material secured to said inner coiled layer of said sheet material by molding.